United States Patent
MacIntosh et al.

(10) Patent No.: US 8,349,285 B2
(45) Date of Patent: Jan. 8, 2013

(54) METHOD OF RECLAIMING CARBONACEOUS MATERIALS FROM SCRAP TIRES AND PRODUCTS DERIVED THEREFROM

(75) Inventors: Andrew D. E. MacIntosh, Ottawa (CA); Vincent W. Y. Wong, Dunrobin (CA)

(73) Assignee: Raymond Chabot Inc., Ottawa, Ontario (CA)

( * ) Notice: Subject to any disclaimer, the term of this patent is extended or adjusted under 35 U.S.C. 154(b) by 0 days.

(21) Appl. No.: 13/095,026

(22) Filed: Apr. 27, 2011

(65) Prior Publication Data

US 2011/0200518 A1 Aug. 18, 2011

Related U.S. Application Data

(62) Division of application No. 12/697,818, filed on Feb. 1, 2010, now Pat. No. 7,959,890.

(60) Provisional application No. 61/162,847, filed on Mar. 24, 2009.

(51) Int. Cl.
*C01B 31/00* (2006.01)

(52) U.S. Cl. .............. 423/449.1; 423/445 R; 423/449.7; 521/40; 521/40.5; 521/41; 521/41.5; 201/13; 201/21; 201/22; 110/267; 110/104 B; 585/240; 585/241; 422/150

(58) Field of Classification Search .................... 521/40, 521/40.5, 41, 45.5, 46; 528/480, 481, 503; 423/445 R, 449.1, 449.2, 449.6, 449.7, 449.8, 423/450, 451, 452, 460, 461; 526/335; 201/3, 201/13, 21, 22; 422/150, 164; 585/240, 585/241; 110/267, 101 R, 104 B See application file for complete search history.

(56) References Cited

U.S. PATENT DOCUMENTS

| | | | |
|---|---|---|---|
| 3,462,160 A | 8/1969 | Adams | |
| 3,644,131 A | 2/1972 | Gotshall | |
| 3,852,399 A | 12/1974 | Rothbuhr et al. | |
| 3,969,457 A | 7/1976 | Paris | |
| 4,590,056 A | 5/1986 | Chen et al. | |
| 5,037,628 A | 8/1991 | Fader | |
| 5,087,436 A | 2/1992 | Roy | |
| 5,728,361 A * | 3/1998 | Holley | 423/449.6 |
| 5,894,012 A | 4/1999 | Denison | |
| 6,046,370 A | 4/2000 | Affolter et al. | |
| 6,221,329 B1 | 4/2001 | Faulkner et al. | |
| 6,736,940 B2 | 5/2004 | Masemore et al. | |
| 6,932,353 B2 | 8/2005 | Amos et al. | |
| 7,329,329 B2 | 2/2008 | Masemore et al. | |
| 7,416,641 B2 | 8/2008 | Denison | |
| 2002/0117388 A1 | 8/2002 | Denison | |
| 2008/0286192 A1 | 11/2008 | Hamby et al. | |
| 2009/0142250 A1 | 6/2009 | Fabry et al. | |

FOREIGN PATENT DOCUMENTS

| | | |
|---|---|---|
| CA | 2364518 | 9/2000 |
| CA | 2423714 | 4/2002 |
| CA | 2255330 | 7/2003 |
| GB | 2303859 | 3/1997 |

(Continued)

*Primary Examiner* — Frances Tischler
(74) *Attorney, Agent, or Firm* — Patrick J. Hofbauer

(57) ABSTRACT

The invention relates a pyrolytic carbon black produced from pyrolyzed rubber, the pyrolytic carbon black having an ash content ranging between 9-15%, a toluene discoloration at 425 mu of between 80-90% transmission, an iodine adsorption between 30 and 45 mg/g; and, an n-dibutyl phthalate absorption number of or to 65 cc/100 gm.

10 Claims, 11 Drawing Sheets

FOREIGN PATENT DOCUMENTS

| | | |
|---|---|---|
| WO | 9908849 | 2/1999 |
| WO | 0144405 A1 | 6/2001 |
| WO | 0226914 A2 | 4/2002 |
| WO | 2006119594 | 11/2006 |
| WO | 2008133888 | 6/2008 |
| WO | 2008144381 A2 | 11/2008 |
| WO | 2008147711 A1 | 12/2008 |

* cited by examiner

METHOD OF RECLAIMING CARBONACEOUS MATERIALS FROM SCRAP TIRES AND PRODUCTS DERIVED THEREFROM

CROSS-REFERENCE TO PRIOR APPLICATIONS

This application is a divisional of application Ser. No. 12/697,818 filed Feb. 1, 2010, which is a non-provisional of provisional application No. 61/162,847 filed Mar. 24, 2009.

FIELD OF THE INVENTION

The present invention relates to the field of waste recycling, and more particularly, to methods for reclaiming useful carbonaceous materials from scrap rubber materials, such as, for example, scrap rubber tires.

BACKGROUND OF THE INVENTION

The continuing accumulation of scrap tires is a major global environmental hazard. The industrialized world continues to amass used tires at the alarming yearly rate of one for every man, woman, and child.

According to the Rubber Association of Canada, there are 29.8 million scrap tires generated annually in Canada (equating to 37.1 million passenger tire equivalents). This generation comes from both the replacement tire market and vehicles that have been scrapped.

In the United States, the Rubber Manufacturers Association estimates that 299 million scrap tires were generated in 2005. Of this, an estimated 42 million tires were stockpiled in landfills, contributing to a total 188 million tires in total stockpiled across the US (the US EPA estimates the stockpiled amount to be 265 million).

Generally, landfill use is declining while the recycling of tires is growing. Currently, approximately 70% of scrap tires are processed in Canada with the balance being stockpiled or exported. However, these proportions can vary considerably by province. For instance, it is estimated that roughly half of all scrap tires generated in Ontario each year are sent over the US/Canada border to be burned as fuel in the US. In Quebec, somewhere between 30% and 40% of scrap tires each year are sent to privately-owned stockpiles located throughout the province.

Moreover, the demanding product specifications for safe, durable tires make scrap tires difficult and expensive to break down.

Tires, which are generally composed of approximately 65% rubber, 10% fibre and 12.5% steel by weight, can be recycled in two forms: processed and whole. Whole tire recycling involves using the old tire, as is, for other purposes (e.g., landscape borders, playground structures, dock bumpers and highway crash barriers). The recycling of processed tires, on the other hand, requires first reducing the tire to smaller pieces. This can be accomplished by chopping, shredding, or grinding at ambient or cryogenic temperature.

Punching or die cutting small sections of rubber from tire treads or sidewalls can be used to create items such as water troughs. This technique is typically done with non-road tires, such as those used on earth moving or mining equipment, or farm tractors.

The process of shredding and grinding scrap tire rubber, and the shred size, depends upon its intended end use. Possible applications include using shred as a lightweight fill for highway embankments, retaining walls and bridge abutments, and as an insulation to limit the depth of frost penetration beneath roads.

Crumb rubber is produced by either an ambient or cryogenic grinding process. Ambient processing is conducted at room temperature. Cryogenic processing uses liquid nitrogen, or other materials or methods, to freeze the rubber chips or particles prior to further size reduction. Particle sizes range from one-quarter inch to fine powder generally used for producing molded products. Uses for larger sized crumb rubber include safety and cushioning surfaces for playgrounds, horse arenas and walking and jogging paths.

Through the use of heat and pressure and a binder, crumb rubber may be molded into various products. Examples include rubber mats used in skating rinks, roof shakes, and rubber mattresses used in livestock stalls.

The production of energy from tires, although technically not a form of recycling, accounts for a significant proportion of used tire disposal. In this application, scrap tires are used as an alternative to coal for fuel in cement kilns, pulp and paper mills, and industrial and utility boilers. This is especially the case in the United States, where tire-derived fuel (TDF) accounted for approximately 155 million scrap tires in 2005, or about 52% of all scrap tires generated.

The tire recycling market faces challenges in that recycled rubber products often cannot meet the quality of products made from virgin rubber, yet they often are more expensive to make. For example, rubberized asphalt is more expensive than normal asphalt, but has not proved to be superior to it; in fact, many transportation engineers are skeptical of its merits. When it is time to repave a rubberized-asphalt road, the top layer cannot be stripped off, heated and reused, because the heat burns the rubber and releases toxic emissions. In addition, rubberized asphalt consumes 25% more petroleum.

As well, considerable research has gone into rubber devulcanization, whereby recycled tires are used in the production of molded or die cut rubber materials such as mats, tubs, and pails such as mats, tubs, and pails. However, the final renewed material has slightly different chemical properties from virgin rubber, and is more rigid and less flexible. As a result, the recycled material does not meet the stringent requirements of modern tire manufactures, nor can it be used in the manufacture of flexible products such as hoses. As these applications account for 85% of Canada's rubber market, the potential supply of devulcanized rubber tends to exceed demand. In addition, the cost of processing old tires, particularly modern radial tires with steel belts, into devulcanized rubber exceeds the cost of virgin rubber production. As a result of this quality/cost challenge, many rubber recycling enterprises either cannot sustain themselves on a commercially attractive basis, or, worse, cannot prosper without government assistance.

Meanwhile, TDF activity has increased, but this is facing more opposition each year. Firstly due to air quality concerns from the general public and civil society organizations. Burning in cement kilns or incinerators results in high $NO_x$, dioxins, PAH, furans, PCB and heavy metals in particulates (flue dusts). Moreover, the high-tech incinerators needed for such operations are very expensive. To ensure their long-term economic stability, heavily-urbanized regions generating a huge and constant supply of scrap tires are required. A current example of public aversion to TDF is the recent ruling by Ontario Divisional Court to uphold a citizen-led appeal of Lafarge Canada's plan to burn tires and other materials in a cement kiln in Bath, Ontario. The appeal cited concerns about potential air pollution, water contamination, and human health impacts.

Pyrolysis systems refer to the thermal processing of waste in the absence (or near absence) of oxygen. Major component fractions resulting from the pyrolysis of vehicle tires are:

a) a gas stream containing primarily hydrogen, methane, carbon monoxide, carbon dioxide and various other gases. The gas after cleaning is very similar to natural gas with about the same energy content, but with a higher heat content;

b) a liquid fraction of an oil stream containing simple and complex hydrocarbons similar to No. 6 fuel oil; and, c) a char consisting of almost pure carbon, plus some inert materials (e.g. steel, zinc oxide) originally present in the scrap tire.

A traditional pyrolysis process involves heating tires under substantially anaerobic conditions so that the tire material is not completely converted to gases and ash. The typical automobile tire contains approximately 4 litres of oil, about 230 g of fibre, a kilogram or more of carbon black and about a kilogram each of steel and methane.

However, despite prior art efforts to commercialize pyrolysis technology, it has not yet been achieved in an economically viable way. Although many pyrolysis projects have been proposed, patented, or built over the past decade, none have been commercially successful. Many of these processes are not truly continuous, but are, in at least some aspects or steps, limited to batch processing techniques. As such, they suffer from not being sufficiently scalable so as to be commercially viable. Others require excessive energy inputs to produce end products of sufficiently high quality to permit recycling, with the result that they are not economical. In particular, the products of batch-type tire pyrolysis have limited marketability due to the low quality of their end products as compared to virgin materials. For instance, prior art pyrolytic carbon black (CBp) typically contains too many contaminants for use in new tires. Moreover, with batch pyrolysis techniques, the consistency of the end products may vary with each run. As such, the resulting CBp cannot compete in the auto, rubber, and other industry sectors, which require consistent a carbon black product. As a result, much of the CBp arising from existing pyrolysis processes are used as high grade coal for the fuel industry, as well as for industrial hoses, mats, roofing materials and moldings.

Accordingly, none of these prior art recycling processes have received the widespread acceptance level necessary to effectively tackle the environmental problem posed by ever-increasing levels of scrap tires.

SUMMARY OF THE INVENTION

In accordance with the present invention there is disclosed an environmentally friendly, commercially viable, and substantially continuous process for recycling scrap rubber tires to produce distillate oil and gas, steel, and CBp of consistently high quality. Oil recovered from the process has been verified to be within the specifications for No. 6 fuel oil. The type of steel generated by the pyrolysis process of the present invention is classified as a No. 1 or No. 2 Heavy Melting Steel (HMS). The quality of the CBp has been verified to have characteristics comparable to virgin Prime N-600 or N-700 series of carbon black.

According to a further aspect of the present invention there is described recycled rubber when produced by a continuous process comprising the steps of:

a) shredding cleaned rubber tires into shreds less than 2" long, and preferably 1.5" long.

b) pyrolyzing the shreds in a reaction chamber of a thermal processor in a first anaerobic environment to produce a char;

c) drawing off volatile organics from the reaction chamber;

d) removing the char from the reaction chamber;

e) cooling the char in a second anaerobic environment;

f) removing metal and textile components from the char to obtain CBp;

g) milling and sizing the CBp so obtained into particles of 325 mesh size or smaller; and, h) utilizing the CBp from the previous step in a polymerization process that produces said recycled rubber.

According to another aspect of the present invention, the temperature within the reaction chamber is between about 450-550° C., and preferably at about 500° C. More specifically, a temperature profile exists, where the temperature is maintained in four zones for at least 30 minutes each. Preferably, the temperature profile is in 4 different zones: 500, 550, 550, 550° C. for at least 30 minutes.

According to yet another aspect of the present invention, the recycled rubber process further comprises, after step g), and before step h), the step of pelletizing the CBp into pellets of 60 to 100 mesh size.

According to yet another aspect of the present invention, the recycled rubber product of the above process has a minimum tensile strength ranging between 2500-3100 psi.

According to another aspect of the invention, there is produced a high quality CBp from a continuous recycling process for rubber tires comprising the steps of:

a) shredding cleaned rubber tires into shreds less than 2" long;

b) pyrolyzing the shreds in a reaction chamber of a thermal processor in a first anaerobic environment to produce a char;

c) drawing off volatile organics from the reaction chamber;

d) removing the char from the reaction chamber;

e) cooling the char in a second anaerobic environment;

f) removing metal and textile components from the char to obtain CBp; and, g) milling and sizing the CBp so obtained into particles of 325 mesh size or less.

According to another aspect of the invention, the process includes, prior to step b), a cleaning sub-process to remove any extraneous and residual materials.

According to another aspect of the invention, the process of the previous paragraph further comprises, after step g), the step of pelletizing the CBp into pellets of 60 to 100 mesh size.

According to one further aspect of the invention, there is produced, from pyrolyzed rubber, CBp having:

a) an ash content ranging between 9-15%;

b) a toluene discoloration (425 mu) of 80-90% transmission;

c) an iodine adsorption between 30 and 45 mg/gm; and, d) an n-dibutyl phthalate absorption number of up to 65 cc/100 gm.

According to another aspect of the invention, there is provided a method of reclaiming carbonaceous materials from scrap tires comprising the steps of:

a) shredding rubber tires into shreds less than 2" long;

b) pyrolyzing the shreds in a reaction chamber of a thermal processor in a first anaerobic environment to produce a char;

c) drawing off volatile organics from the reaction chamber;

d) removing the char from the reaction chamber;

e) cooling the char in a second anaerobic environment;

f) removing metal and textile components from the char to obtain pyrolytic carbon black;

g) milling and sizing the pyrolytic carbon black so obtained into particles of 325 mesh size or smaller; and, h) utilizing the pyrolytic carbon black from the previous step in a polymerization process that produces recycled rubber.

The process according to the invention is a continuous feed, closed loop, controlled atmosphere pyrolysis process. The process uses special valves to maintain a constant production environment and to be able to consistently produce specified end-use products, including a consistently structured, high quality CBp that the market requires. The process is capable of running 24/7 non-stop for 340 days per year, creating substantially the same end products in characteristic and size throughout the operating term.

It is thus an object of this invention to obviate or mitigate at least one of the above mentioned disadvantages of the prior art, and to provide at least one or more of the above-described advantages over the prior art.

Other advantages, features and characteristics of the present invention, as well as methods of operation and functions of the related elements and structures, and the combination of steps and economies of process, will become more apparent upon consideration of the following detailed description and the appended claims, with reference to the accompanying drawings, the latter of which is briefly described hereinbelow.

BRIEF DESCRIPTION OF THE DRAWINGS

The novel features which are believed to be characteristic of the process and end products according to the present invention, as to their structure, organization, use and method of operation, together with further objectives and advantages thereof, will be better understood from the following drawings in which a presently preferred process according to the invention will now be illustrated by way of example. It is expressly understood, however, that the drawings are for the purpose of illustration and description only, and are not intended as a definition of the limits of the invention. In the accompanying drawings.

DETAILED DESCRIPTION OF THE INVENTION

Described herein is a continuous recycling process involving the pyrolytic decomposition of used rubber tires to consistently produce high quality distillate gas, oil, steel, and CBp as end products that have value and use in today's market. Pyrolysis is meant and understood in this specification and the appended claims to mean the thermal decomposition of matter in the absence (or near absence) of oxygen. In particular, the disclosed process reproducibly yields a pyrolytic carbon black (CBp) that is fine, free of extraneous material, and is of consistently high quality. This high quality CBp can be used in various applications such as molded and extruded rubber, foams, sponge, wire coverings, cable, roofing material etc. It is also possible that certain tire applications such as innerliners, carcasses and side walls could utilize CBp produced by the process of the present invention in a blend with virgin carbon black.

The Pre-Treatment of Tires

Figure 1:
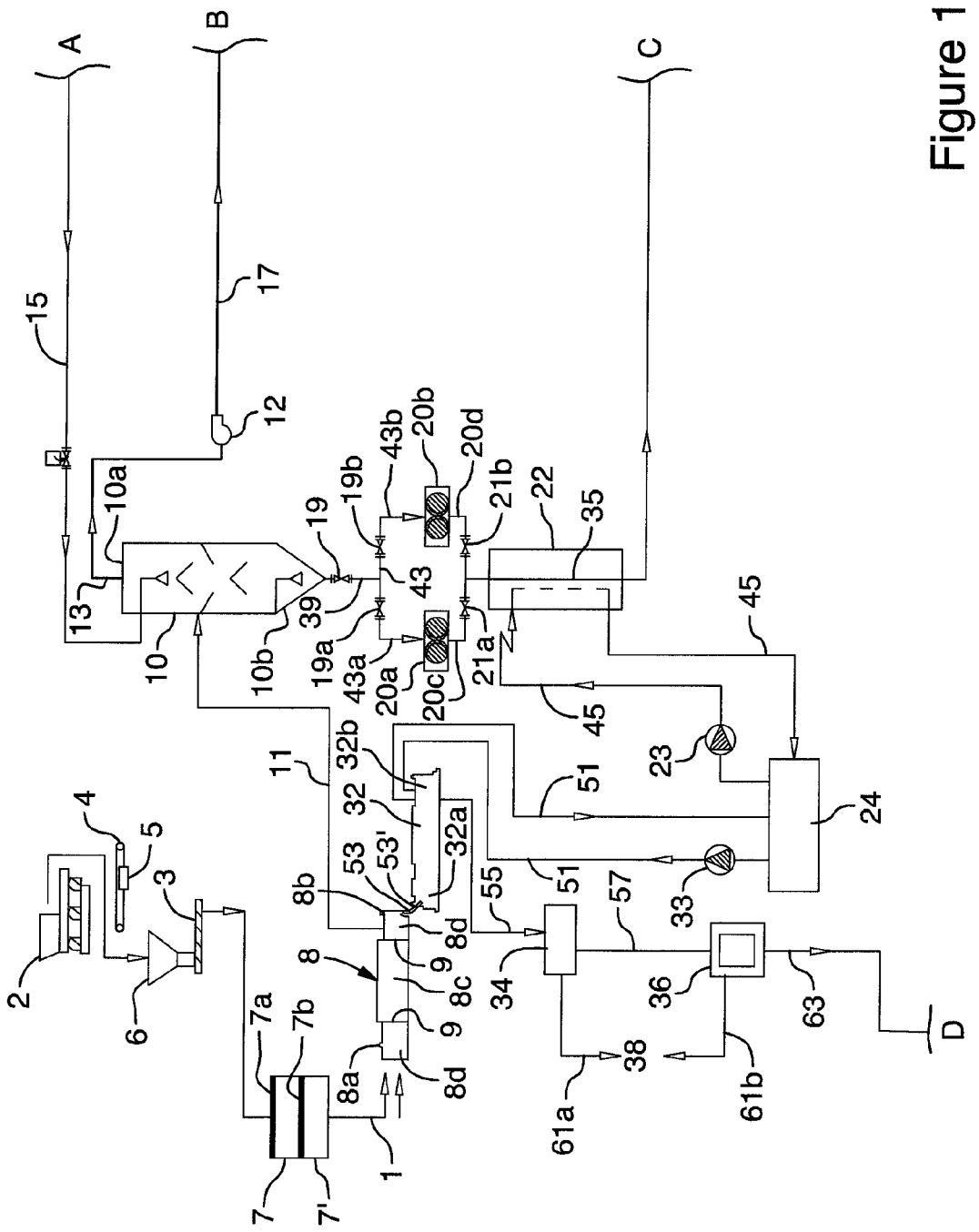
FIGS. 1-4 are different sections of a flow diagram which sections together illustrate an example of a process according to the invention.

As a prelude to FIG. 1 and prior to shredding, the tires to be recycled are thoroughly cleaned to remove all extraneous material adhered to the tires such as grit, earth, clay and dirt. It has been found that the removal of all extraneous material is important to ensure the reproducibility and quality of the CBp produced. Residual grit not only adds to the ash content in the carbon black product, but it also raises the energy and cost of the process due to the more arduous milling necessary to grind the grit to the desired particle size.

The water used for washing the tires is preferably recycled. Surprisingly, it has been found that this water, which now contains the grit and dirt removed from the tires, becomes increasingly acidic with each wash cycle. This is problematic, as it causes corrosion and pitting of the metallic surfaces of the equipment, such as the blades of the shredder. Therefore, to continuously reuse the water, but eliminate the costly corrosion problems induced by the acidity of the waste water, it must not only be filtered to remove the solid contaminants but must also be neutralized before reintroducing it into the washing cycle.

The cleaned tires are shredded in the presence of water not only to provide an additional cleaning step but also to reduce the wear and tear on the blades. The tires are cut into rubber pieces of 2" (on the diagonal) or less, and preferably 1.5" or less, and more preferably approximately 1.5". A selection screen in the shredder (not shown) allows shreds of 1.5" or smaller to pass through while those that are bigger are returned to the shredder for further shredding. The shreds that pass through the screen are distributed onto a conventional conveyor belt where they are dried by forced, dry and heated air to remove all moisture. Once dried, the shreds are stored in a storage silo.

Referring now to FIGS. 6A-6D, there is shown a preferred embodiment of the cleaning steps that are used to provide some of the aforementioned advantages. First, whole tires are received and weight at scale 210 before being deposited by dump truck 214 onto conveyor 216. The whole tires are then distributed through diverter 218, where some tires are placed in outdoor storage for future use, and those to be used are diverted to a primary feed conveyor 220 and onto a primary shredder 222. Primary shredder 222 shreds the whole tires into relatively larger pieces. Typically, spray water is added to the primary shredder 222 for lubricating the shreds.

Next, the shredded tire pieces proceed to a vibratory discharger 224 where sprinklers 226 spray the shreds to wash off dirt and grit. The wash water is collected, and pumped via pump 228 to primary sedimentation tank 230, with overflow draining to a secondary sedimentation tank 232, also used as a neutralization tank for pH balancing. It has been discovered that the aforementioned lubricating and wash water becomes acidic, and thus the recycled water is pH balanced prior to being reused. Some of the water is cycled to a storage location as will be described below.

Figure 6A:
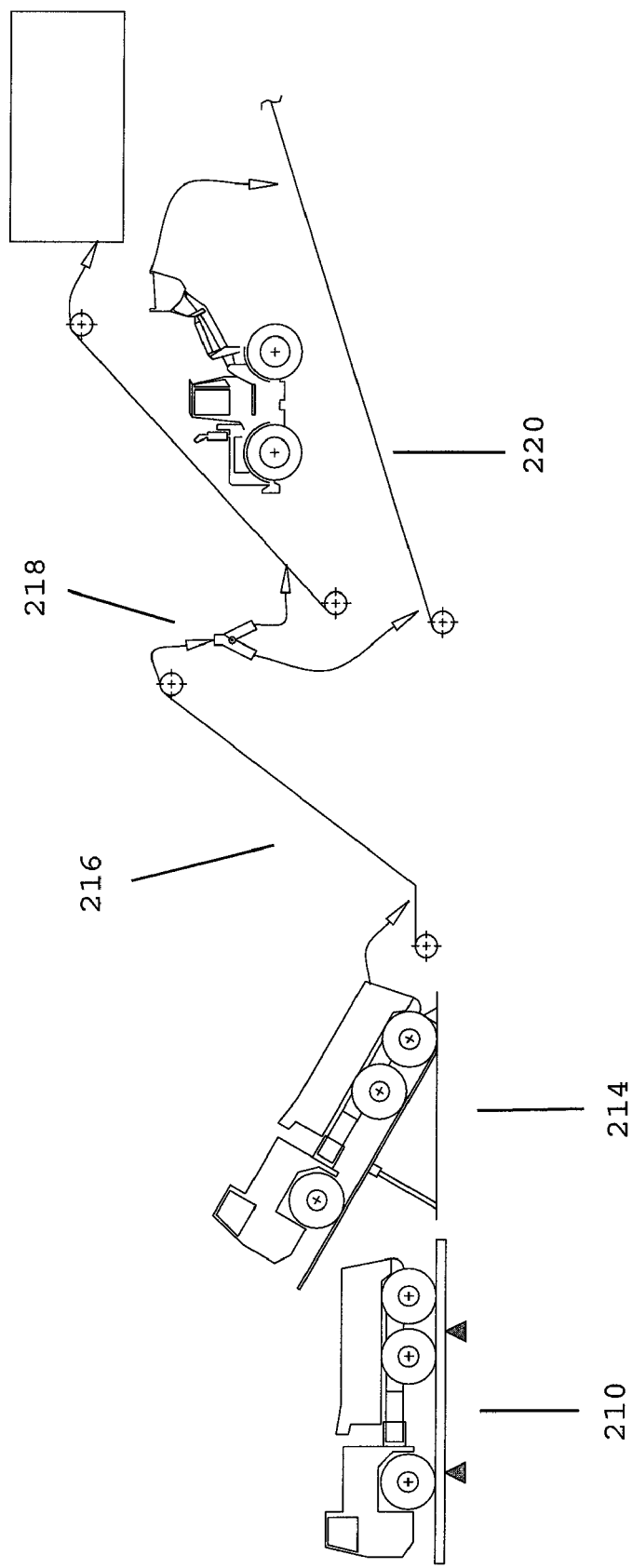
FIGS. 6A-6D are different sections of a flow diagram showing cleaning steps prior to the process of FIG. 1.
Figure 6B:
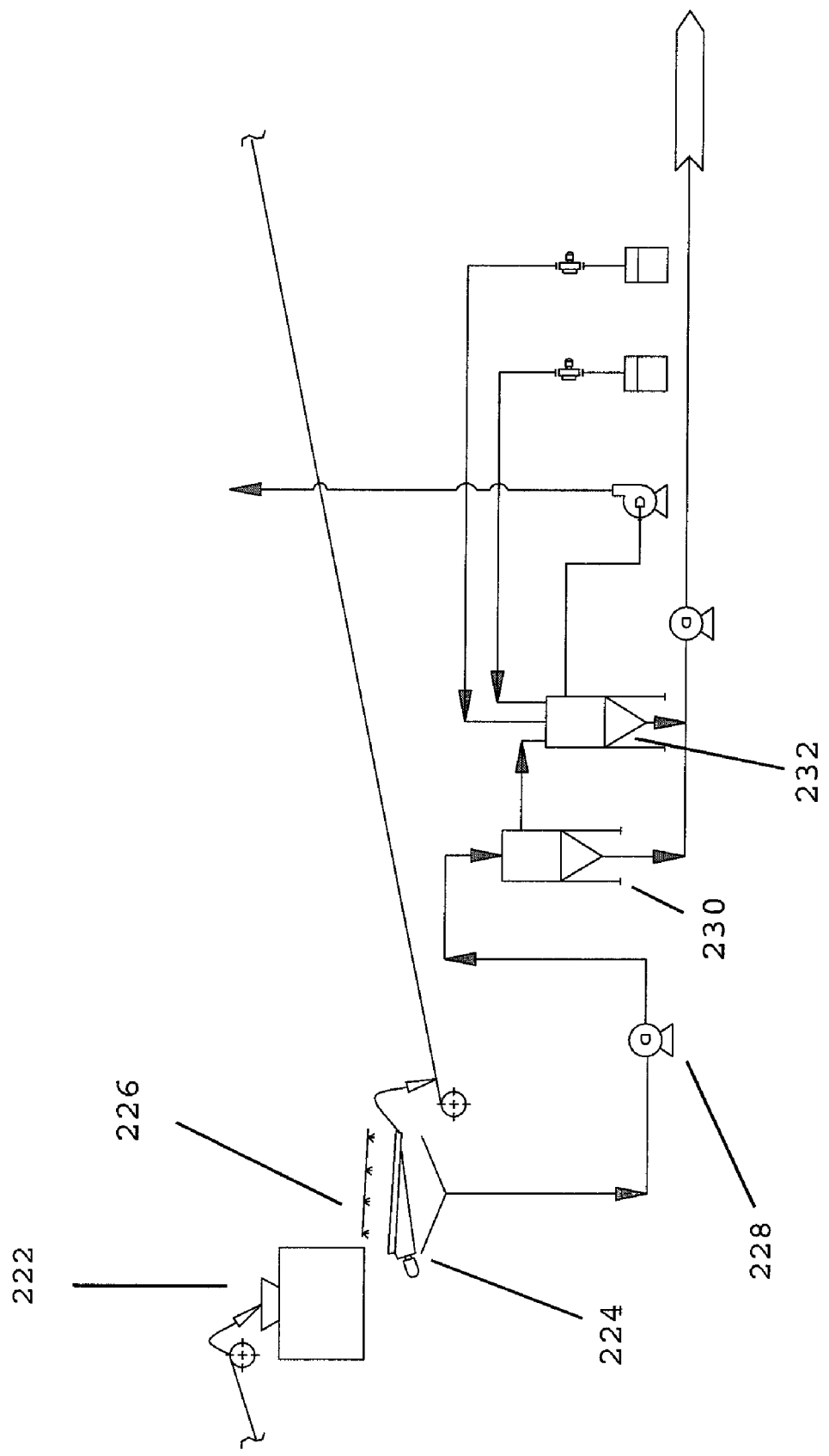
Figure 6C:
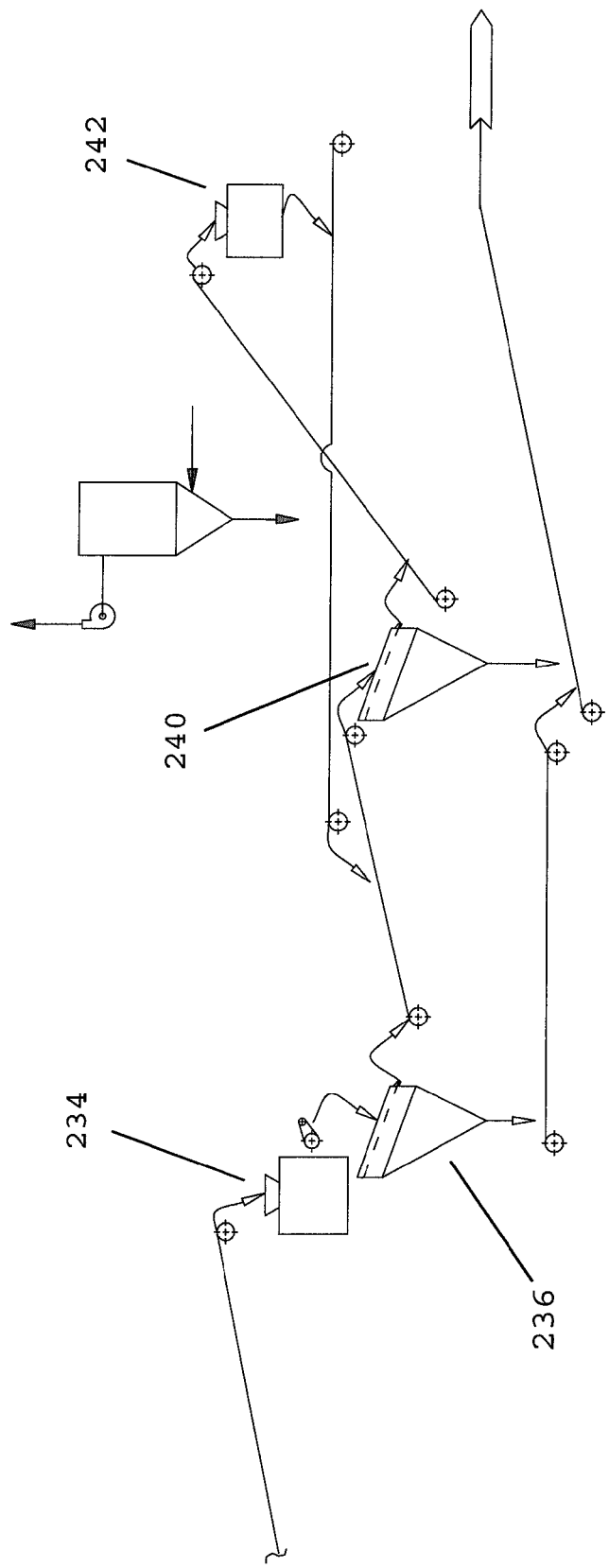

Returning now to the path of the tire shreds, and referring to FIG. 6C, the tire shreds are fed into a secondary shredder 234 where they are preferably shredded into pieces 1.5" long on the diagonal. These smaller shreds then pass through a double deck disc classifier 236, that sorts the shreds and directs those sized 1.5" or smaller to chip storage 238. The larger sized shreds proceed to a vibrating screen 240 where, any shreds sized 1.5" or smaller that were not sorted properly by disc classifier 236 are directed to storage 238 and larger sized shreds continue to third shredder 242. The shreds are then cycled back to the vibratory screen 240, as shown, and the process is repeated from this point to ensure chip size consistency and provide a maximum number of operational days. Optionally, a dust collection control system may also be installed to control the dust in the surrounding areas and pollution levels, as may be required. The shreds are also preferably dried to have a moisture level of less than 1%.

Figure 6D:
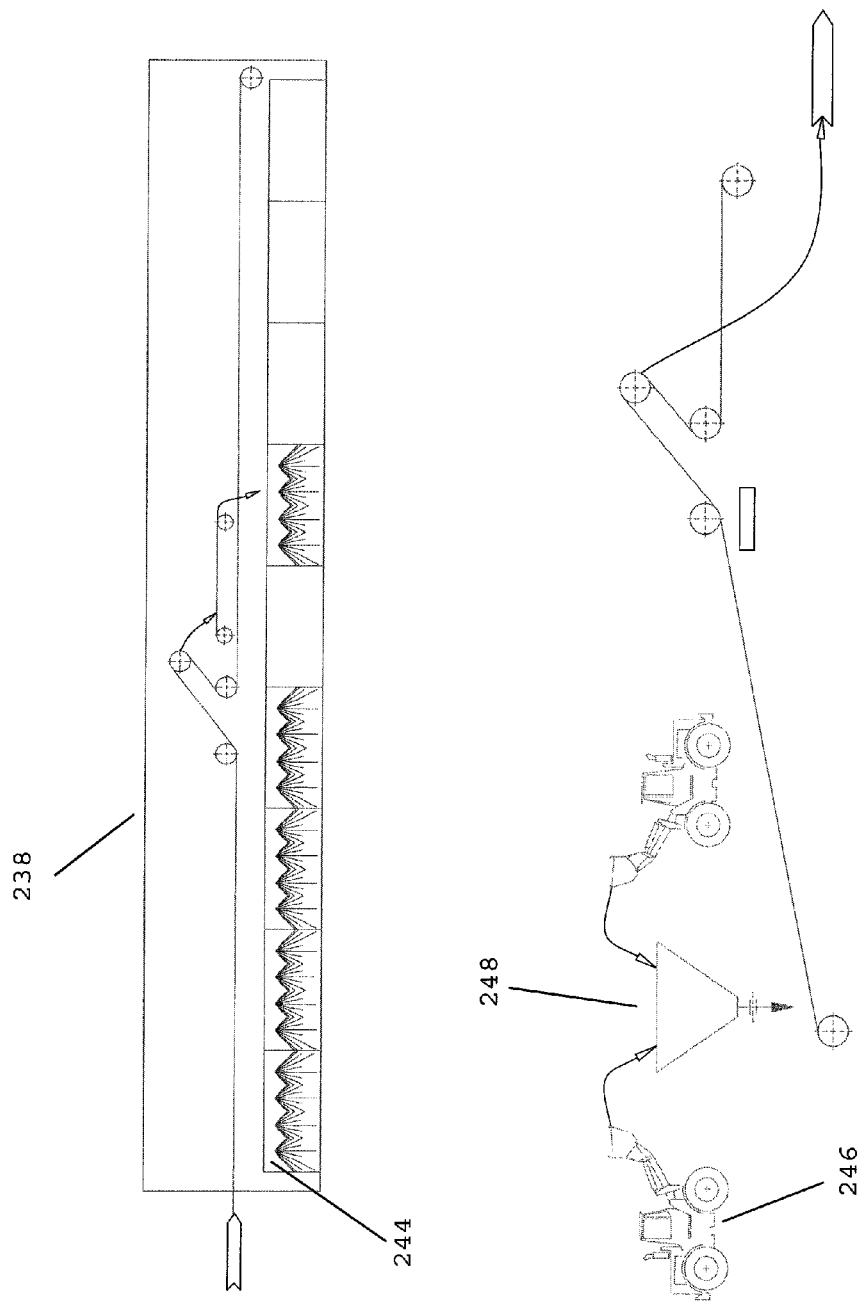

FIG. 6D shows chip storage 238, where chips are stored in a number of compartments. Preferably, each compartment includes sprinkler systems 244 using water recycled after pH balancing as discussed above.

The shreds are then moved, for example, by front loading vehicles 246 to hopper 248, from where they are directed to the continuous and complete process according to the invention as described below.

The Process

Referring now to FIG. 1 through 4 of the drawings, there is disclosed a continuous and complete process according to the invention for the recycling of used rubber tires shreds.

Figure 5:
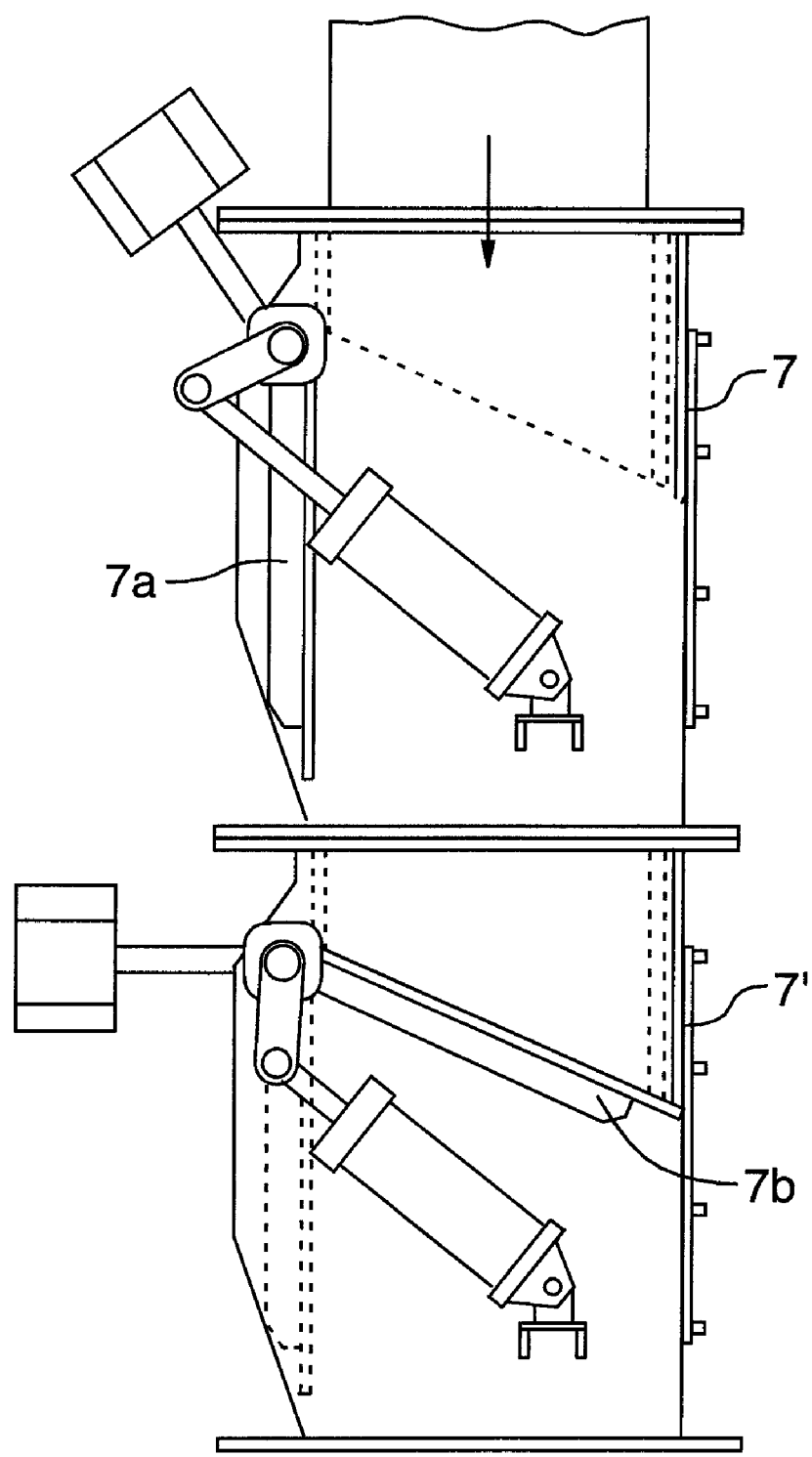
FIG. 5 is a detailed diagram of two vertically stacked flap valves referenced in FIG. 1.

From the storage silo, the rubber shreds are fed into a conveying and dispersing assembly that, for example, could consist of a vibrating feeder 2, a belt conveyor 4 with belt scale 5, a hopper 6, and screw feeder 3. The purpose of the conveying and dispersing assembly is to transport, on a continuous basis, a measured volume of shreds onto one of two serially arranged, fast acting pneumatic flap valves 7, 7' (see FIG. 5 for more detail) set up in sequence above the opening of the reaction chamber 8c of a rotary thermal processor, or calciner 8. A suitable type of rotary calciner 8 is a gas-fired Bartlett-Snow 72" diameter Rotary Calciner (shown in FIG. 7A) available from Alstom Power, Inc. of Warrenville, Ill., USA. Suitable flap valves 7, 7' are available from Alstom Power, Inc. of Warrenville, Ill., USA. The shreds are gravity fed from the screw feeder 3 onto the flap 7a of the top flap valve 7 which opens and closes according to a predetermined frequency that is electronically controlled (preferably, about 6 dumps/min). As the flap 7a opens, the collection of tire shreds fall by gravity onto the closed flap 7b of the bottom flap valve 7', and the top valve 7 immediately returns to its closed position. Thereafter, as the flap 7b of the second valve 7' opens, the shreds are fed through a feed chute 1 down into the opening of the rotary calciner 8.

The fast acting pneumatic flap valves 7, 7' function as atmospheric interlocks between the open air (oxygenated) environment of the screw feeder 3 and the inert atmosphere (oxygen-free) reaction chamber 8c of the calciner 8. To restrict the unwanted introduction of oxygen into the calciner 8, an inert gas such as nitrogen is introduced between the two flap valves 7, 7' so as to create a positive nitrogen pressure in both valve cavities. Nitrogen is beneficial for two purposes: (i) to create an inert atmosphere to avoid combustion and possible explosion; (ii) the right amount of nitrogen, based on test results is ideally no less than 0.007 volume/minute of the calciner internal volume. Insufficient amounts of nitrogen will affect the char quality. The purpose of the nitrogen is to ensure the calciner is in an inert atmosphere and reduce the chance of pyrolysed gases which could break down and form carbon and redeposit onto the char. Furthermore, it is preferred that the calciner 8 is kept at ¾" to 1¼" of negative water column, controlled by a fan at the downstream side, so as to reduce the retention of the pyrolysed gases which could break down and redeposit onto the char. When flaps 7a, 7b are opened in the aforesaid serial sequence, the positive nitrogen pressure gradient prevents atmospheric oxygen from entering the calciner 8, as the nitrogen gas forces its way out from flap valves 7, 7' to the lower pressure ambient atmosphere. To further reduce the possibility of oxygen entering into the calciner 8, the opening and closing of flaps 7a, 7b are electronically controlled (rather than gravity controlled) to ensure efficient and timely closing of at least one of the flaps 7a, 7b at all times.

The thermal processor (i.e. rotary calciner) 8 in which the pyrolysis takes place, is comprised of, inter alia, an internal rotary cylinder having a feed end 8a and a discharge end 8b, with the reaction chamber 8c disposed in-between. A spiral flight is preferably located on the internal diameter of the feed end 8a of the calciner 8 as well as being present throughout the reaction chamber 8c. Thus, as the calciner 8 rotates about its longitudinal axis, the spiral flight smoothes out the rubber shreds dumped by the valves 7, 7', and propels the shreds forward into the heating zone of the reaction chamber 8c. The second flight in the reaction chamber 8c moves the solid material along the length of the calciner 8 to the discharge end 8b.

To further assist in transporting the solid material forward, the calciner 8 is preferably positioned slightly off the horizontal such that the feed end 8a is slightly higher than the discharge end 8b. This angled position makes use of gravity to further assist in propelling the solid material through the calciner 8.

The rotary calciner 8 is heated indirectly to preferably create four heating zones within the reaction chamber 8c, each with accessible temperatures ranging between about 450-650° C. A temperature profile is generated according to the type of end products required. Preferably, the heating zones 1, 2, 3 and 4 are heated to 500° C., 550° C., 550° C. and 550° C. respectively. Preferably, the profile has a maximum pyrolysis temperature in the range of about 450-550° C., and preferably about 500° C. in not less than 30 minutes.

The pyrolysis reaction taking place inside the calciner 8 is sensitive to oxygen. Both safety (i.e., explosion risk) and quality issues arise if oxygen is allowed to penetrate in any significant amount into the reaction chamber 8c. Prior to commencing the continuous recycling operation, the calciner 8 must therefore be filled with nitrogen gas (or other inert gas). In addition to also having positive nitrogen pressure in flap valves 7, 7', air tight seals 9 must be fitted at the interfaces between the rotating reaction chamber 8c and the stationary framework 8d surrounding the rotting cylinder to prevent atmospheric oxygen from seeping into the calciner 8 through these interfaces. Gas-tight bellows type seals are preferably used for this purpose. These seals are designed to retain the positive nitrogen pressure within the reaction chamber 8c of the calciner 8. A suitable form of bellows seals is disclosed in U.S. Pat. No. 3,462,160, issued Aug. 19, 1969 to O. J. Adams.

In the course of the pyrolysis process, the rubber shreds are heated to temperatures above 450° C., and preferably to about 500 to 550° C. The anaerobic decomposition of the rubber thus caused produces volatile organics which fill the reaction chamber 8c as volatile organic gas. The pressure inside the calciner 8 is therefore preferably kept slightly under atmospheric pressure to prevent over pressurization of the reaction chamber 8c. The pyrolysis gas is extracted at the discharge end 8b of the calciner 8 through a discharge pipe 11 on the other side of which is a pressure lower than that in the calciner 8. The gas in the reaction chamber 8c is thus suctioned out through the discharge pipe 11 due to this pressure difference.

Figure 7A:
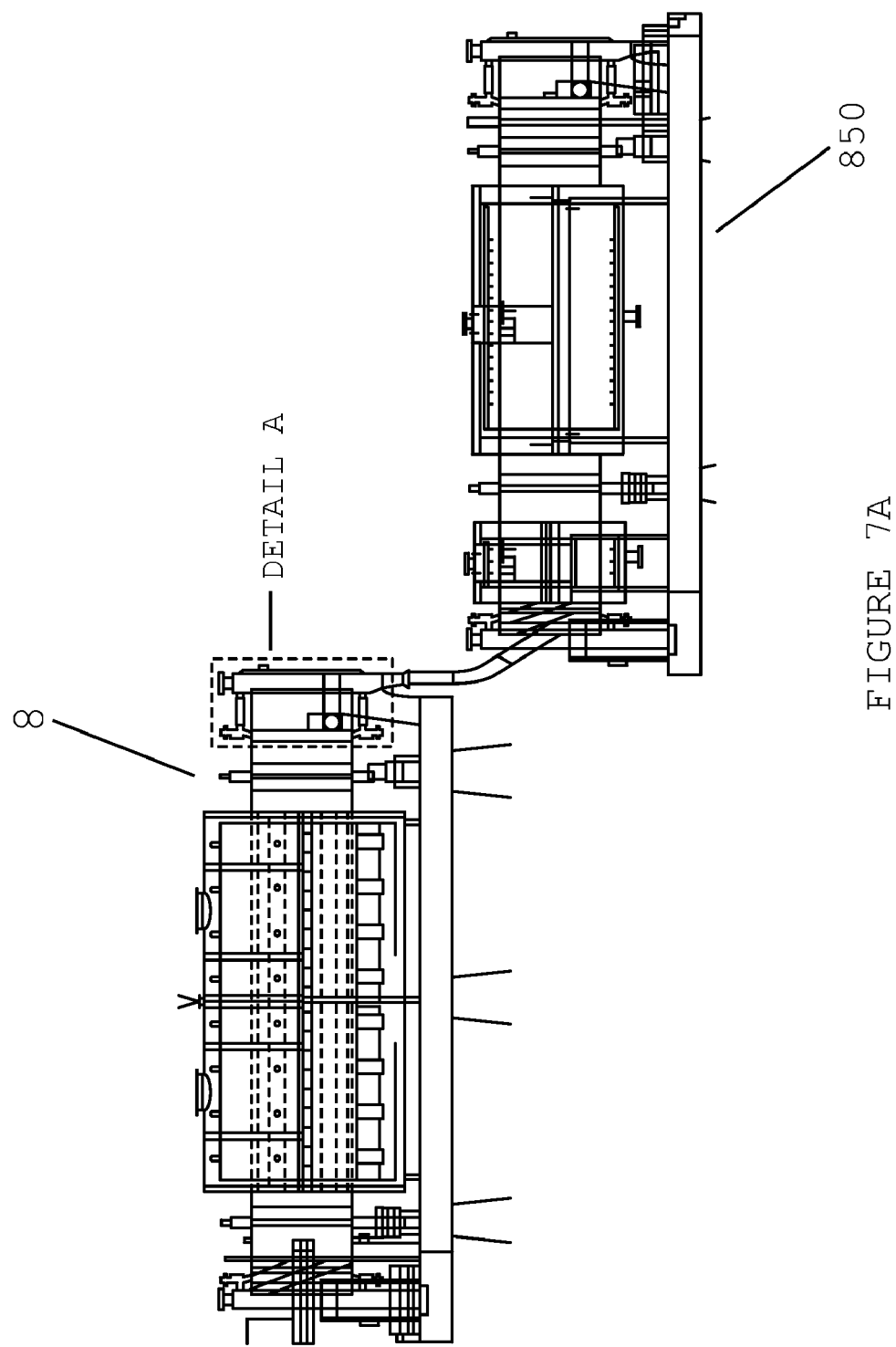
FIG. 7A illustrates a representative calciner for use in the process of FIG. 1.
Figure 7B:
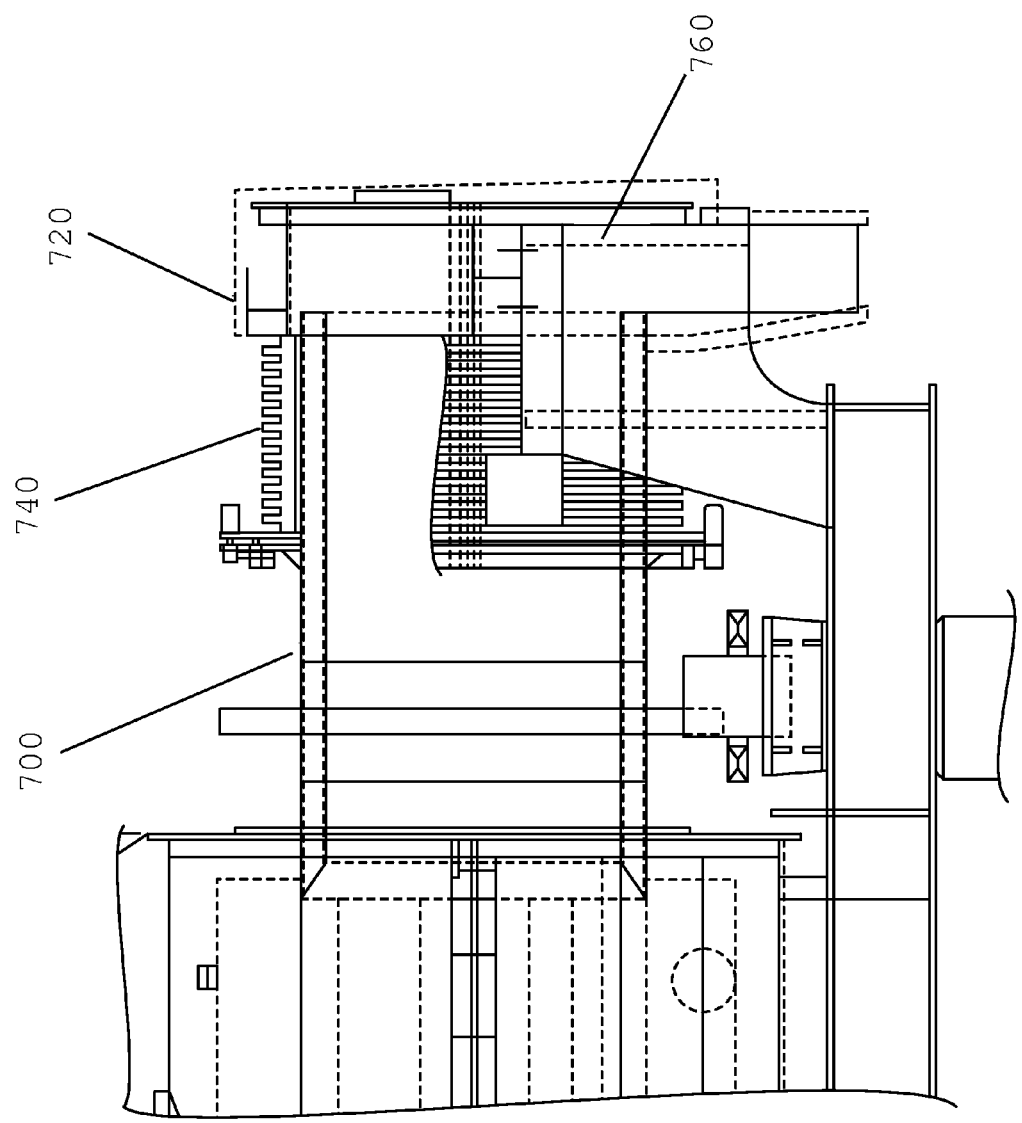
FIG. 7B is a detail view of Detail A shown in FIG. 7A

It has been discovered that in order to produce char of sufficient quality in the pyrolysis process, it is preferable to ensure that the char produced has no, or insignificant amounts of volatile content. Figure The breeching section, that is the end section, of the calciner 8 is maintained at temperature of no less than 500° C. to avoid gaseous condensation back onto the char prior to discharge to the cooler. FIG. 7b shows the discharge end of the representative calciner of FIG. 7a. The end section preferably has a continuous sleeve 700 and the area is insulated with insulation 720 and heat traced in order to keep the temperature to at least 500° C. Also shown are a representative bellows seal assembly 740 and cylinder dish end 760. It will be understood by those skilled in the art that the calciner of FIGS. 7a and 7b is shown for representative purposes only and is not to be considered limiting on the present invention. Generally, any gaseous re-condensation (i.e. below 500° C.) onto the char will produce char with higher than acceptable volatile content.

Figure 2:
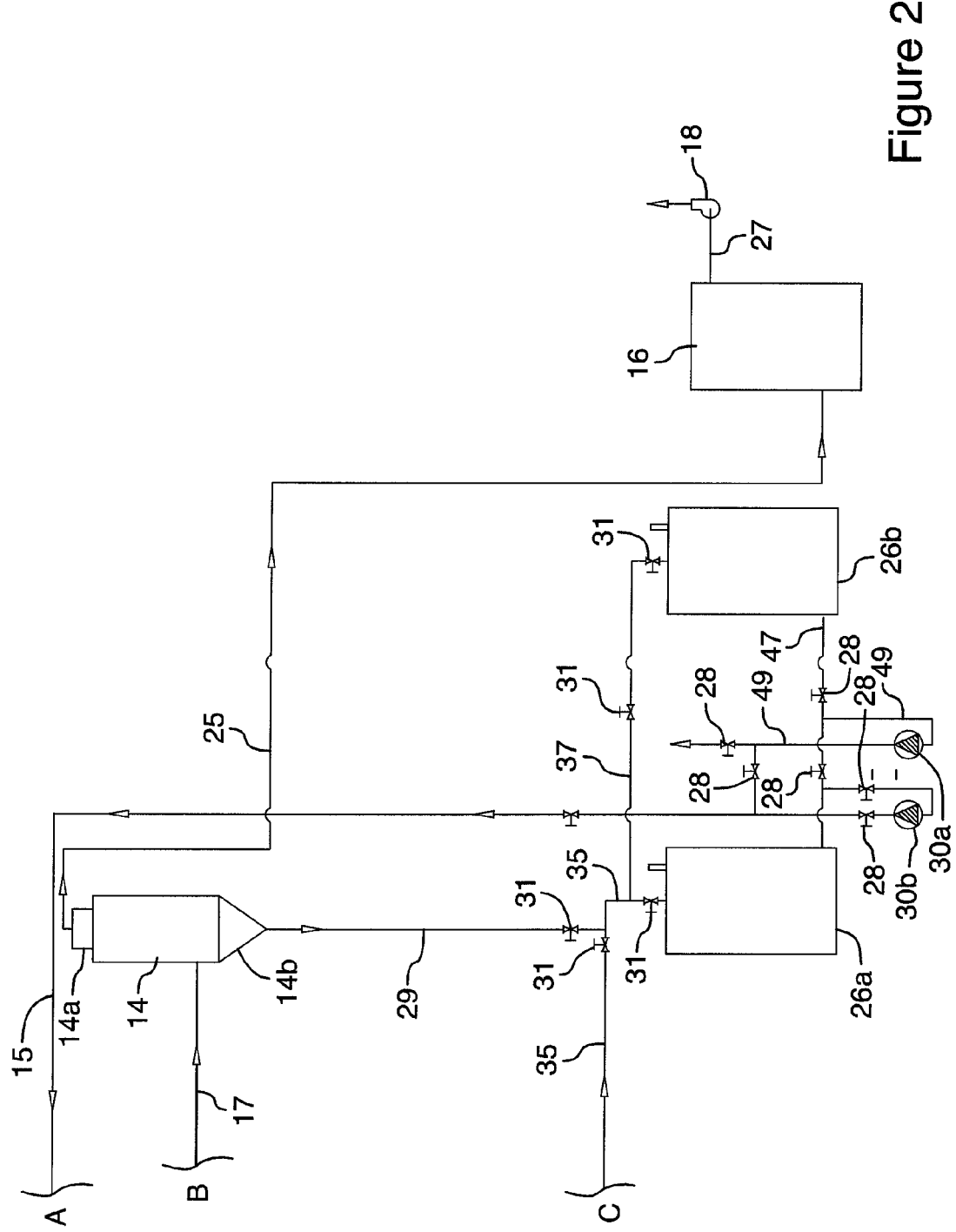
Figure 3:
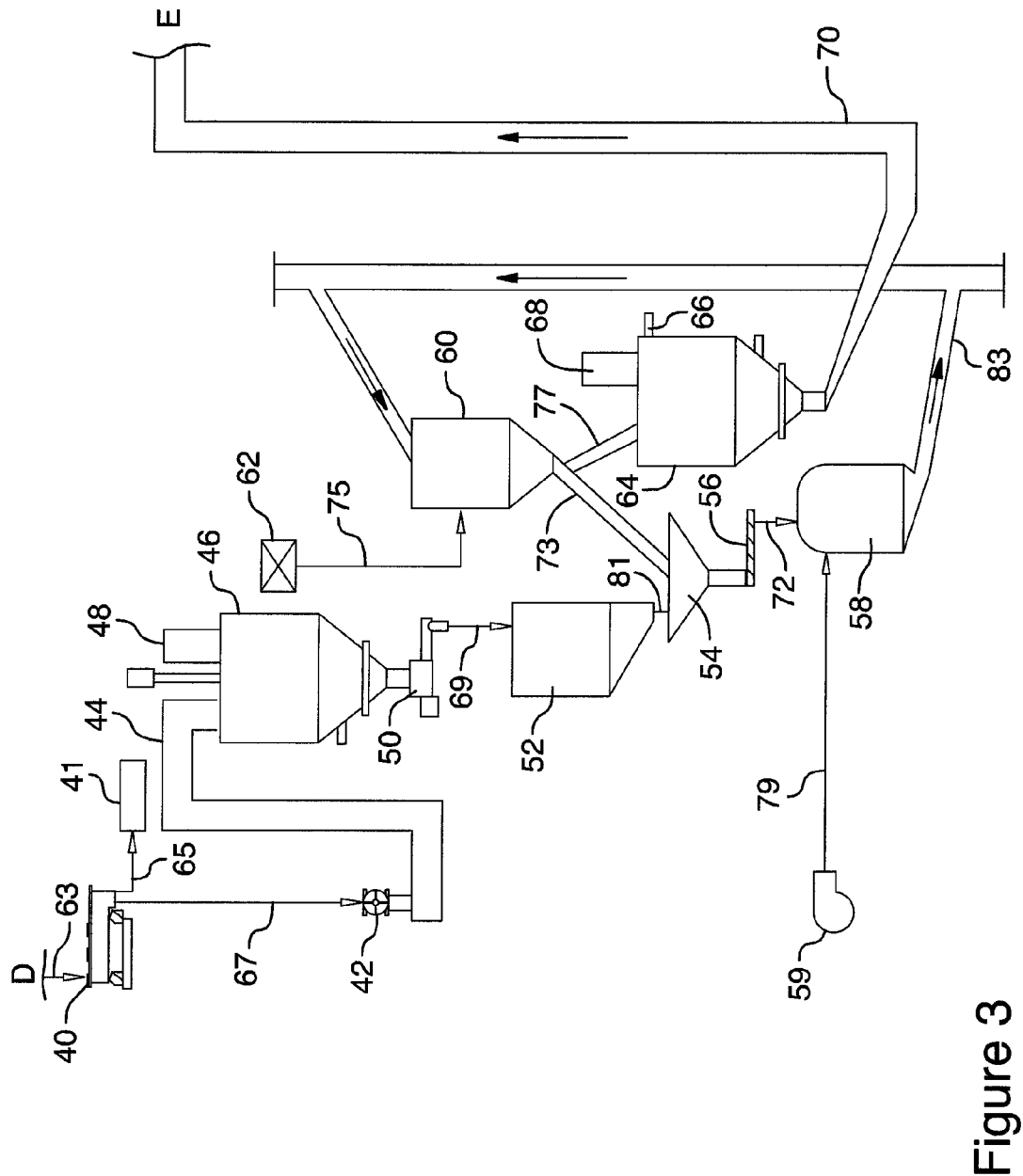
Figure 4:
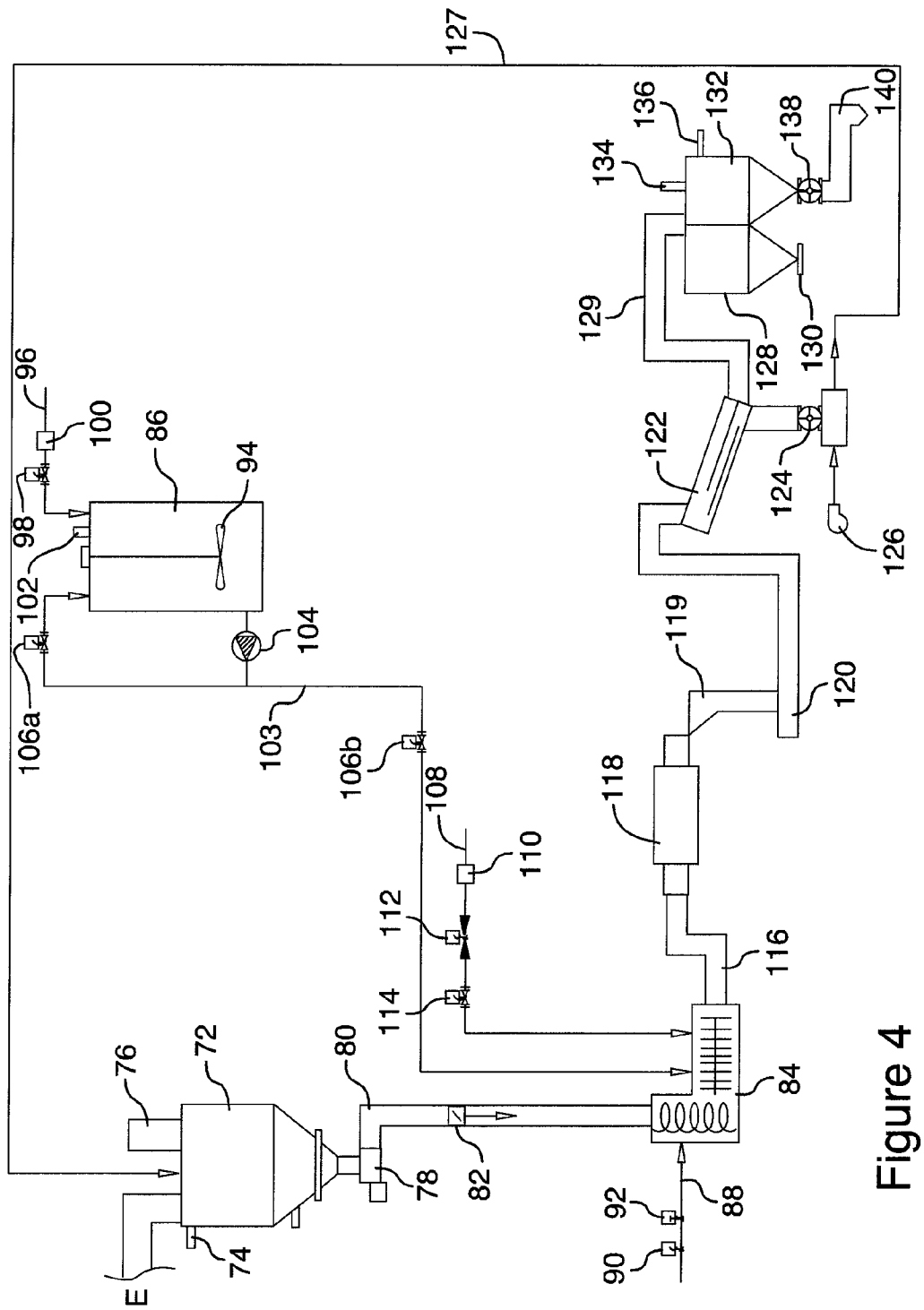

The pyrolysis gas thus obtained is directed by discharge pipe 11 to an oil quench tower 10 to condense out the heavier gases as oil, and to extract the lighter gas which is drawn from the top end 10a of the oil quench tower 10 through suction line 13, and thence pushed by gas blower 12 through line 17 into a separator 14 (see FIG. 2). The separator 14 functions as another extraction stage to separate the lighter gas fraction from any residual heavier gas that can be condensed to oil and subsequently stored. The lighter gas fraction is drawn from the top 14a of the separator 14 through line 25 to storage tank 16. The lighter gas fraction can be drawn out of storage tank 16 through supply line 27 by blower 18 to a tank truck, train or sip, or to another holding vessel for further use. This gas may also be scrubbed and recycled as fuel for, for example, the burners (not shown) used to heat the rotary calciner 8.

As an aside, test results have indicated that the all oils obtained from the process are characterized as No. 6 oils and accordingly, are not being separated into light and heavy oils. The oils are preferably combined and stored, and two condensers in series are used to condense and collect the oil which is stored in a holding tank and then pumped through a filter prior to the storage tank for shipment. Preferably, a hot cyclone is incorporated prior to the gas condensation phase in order to knock out particulates to prevent plugging of pipes and other elements in the condensation system. The non-condensable gas then goes through a scrubbing process, wherein a caustic solution is used to strip all the acidic components. The scrubbed gas is stored to run the calciner and dryer which is used to dry the CBp pellets.

Returning to the process itself, the oil fraction condensed in the lower end 14b of the separator 14 exits through line 29 which, in turn, outputs into line 35. Line 35, in turn, delivers the oil into storage tank 26a, or is discharged into line 37, which optionally directs the oil into storage tank 26b. Lines 29, 35, and 37 are all fitted with conventional control valves 31 to selectively control the flow of oil through interconnected lines 29, 35 and 37.

The oil condensed in the oil quench tower 10 is collected at the lower end 10b of the tower 10, exiting therefrom, through control valve 19, into supply line 39, which in turn, ends in a T-junction at bi-directional junction line 43 having oppositely directed branches 43a and 43b. Each branch 43a and 43b, is preferably fitted with a respective control valve 19a and 19b, one on either side of the T-junction with supply line 39. Moving downstream, each branch 43a, 43b feeds a respective oil filter 20a, 20b. The oil travels downstream from each of the oil filters 20a, 20b into respective supply lines 20c, and 20d, which are further controlled by control valves 21a and 21b installed on supply lines 20c and 20d, respectively. Supply lines 20c and 20d join up downstream of the control valves 21a and 21b at a T-junction with line 35. The oil entering line 35 is directed thereafter through a water-cooled oil cooler plate and frame 22 which cools the oil prior to being stored in storage tanks 26a or 26b. The water in the cooler plate and frame 22 circulates through pipe loop 45 fitted with circulation pump 23. The pipe loop 45 passes through the central cooling water system 24 which cools the warmed water exiting the cooler plate and frame 22 and pumps cold water back into the pipe loop 45.

The oil collected in storage tanks 26a and 26b can be released from the tanks into line 47. Through the use of conventional control valves 28, the oil can either be directed to flow from storage tanks 26a, 26b into line 49 and thence pumped by pump 30a into tank trucks, trains, or ships, or, can be flowed into line 15 and thence pumped by pump 30b back to the oil quench tower 10 for further fractionation.

Referring again to FIG. 1, the hot solid products produced during pyrolysis, i.e. the char, are discharged from the calciner 8 by gravity, falling through the open space of the discharge breeching (not shown) and landing on the first of another two fast acting pneumatic flap valves 53, 53' at bottom of the breeching. Flap valves 53, 53' are substantially identical to the double flap valves 7, 7' positioned at the feed end 8a of the rotary calciner 8, and are also fitted with a gas inlet between them to create a positive nitrogen pressure inside the flap valves 53, 53'. The use of nitrogen at this stage is important, not only to prevent oxygen from entering into the rotary calciner 8, but also to prevent oxidation of the hot char. Oxidation of the char would, inter alia, reduce the quality of the CBp end product. The hot char is therefore passed through the double flap valves 53, 53' and deposited into the feed end 32a of a nitrogen-filled rotary cooler 32, preferably having flighting on the internal diameter to transport the char through rotary cooler 32 to the discharge end 32b. A suitable rotary cooler 32 is a Bartlett-Snow 36" diameter Rotary Cooler available from Alstom Power, Inc. of Warrenville, Ill., USA. The temperature in the rotary cooler 32 is preferably kept low by indirectly cooling the outside surface of the rotating cylinder with water that is continuously circulated by circulation pump 33 through pipe loop 51 and cooled by central cooling water system 24.

The char exits the discharge end 32b of the rotary cooler 32 at a sufficiently low temperature, preferably approximately 200° C., that it can thence be exposed to air without significant reaction therewith (i.e., oxidation). Surprisingly, it has been found that the char is not particularly agglomerated at this stage and a de-agglomeration step is not required as previously described in the prior art (see, for example U.S. Pat. No. 5,037,628, issued to John Fader on Aug. 6, 1991). This can be explained by a reduced oil content in the char produced under the stringent anaerobic operating conditions described by the inventor herein and by a pyrolysis temperature of between about 450-550° C., and preferably at about 500° C. The char is preferably discharged from the rotary cooler 32 into an enclosed screw conveyor 55 and then passed through two magnetic separators 34 and 36: the first to remove the steel 38 from the char, and the second, usually more powerful than the first, to remove rare earth metals and other magnetic matter left behind by the first magnetic separator 34. The char is transported between the first 34 and second 36 magnetic separators by an enclosed conveyor belt 57. The steel 38 extracted from the char is preferably transported away to a central collection location by respective conveyors 61a and 61b, whereat, using the natural gas produced from the pyrolysis process, the steel 38 (compacted into) may be heated, compacted and melted into 100 lb briquettes, ready for use in producing new metal products, or for further processing.

The char, now free of steel 38 and other magnetic components, is preferably transported by an enclosed conveyor belt 63 from the second magnetic separator 36 to a vibrating screen 40, (see FIG. 3), preferably of mesh size 100, to separate out any remaining textile fibers or cords 41 that remain as components of the original scrap tire pieces. These textile remnants are removed from the vibrating screen 40 via conveyor belt 65 for subsequent disposal or possible recycling.

Solid material fine enough to pass through the vibrating screen 40 and onto conveyor 67 is thence referred to as the 'crude' CBp. The conveyor 67 transports the crude CBp to a conventional rotary valve 42 which releases the CBp powder onto an enclosed conveyor 44. A suitable enclosed conveyor can be, for example, a tip track elevator marketed by Unitrack Corp. of 299 Ward Street, Port Hope, Ontario, Canada. The CBp powder is transported by enclosed conveyor 44 to a vibrating bin discharger 46 fitted with a bin vent filter and top mount fan 48 for pollution control. A speed-controlled electronic feeder 50 releases the crude CBp from the vibrating bin discharger 46 into a mill feed bin 52 via enclosed chute 69. The crude CBp exits the mill feed bin 52 by gravity, through enclosed chute 81, into a closed hopper 54, and thence onto an enclosed conveyor belt 56, where it is released down chute 72 into a pulverizer 58 to reduce the particle size. Pulverizer 58 is preferably a Palla™ Vibrating Mill. Air borne particulate matter produced in closed hopper 54 is drawn through conduit 73 to a mechanical air classifier 60 fitted with a 325 mesh, and connected to bag filter 62 via conduit 75. Air borne particles measuring 44 µm or less exit the mechanical air classifier 60 into conduit 77 and are transported therethrough to surge bin 64, which surge bin 64 is fitted with a level indicator 66, and with a vent filter and top mount fan 68.

The CBp in the pulverizer 58 is pushed out by blower 59 connected to the pulverizer 58 by conduit 79. The fine CBp is thus blown out of the pulverizer 58 into the enclosed conveyor 83 which delivers it to the mechanical air classifier 60. Again, particles of 325 mesh size, or smaller, are directed to surge bin 64 through conduit 77. Using a closed conveying system 70, the fine CBp is transported from the surge bin 64 to surge bin 72 (see FIG. 4), also fitted with a level indicator 74 and bin vent filter with a top mount fan 76. The CBp exits the surge bin 72 through an electronically speed-controlled feeder 78 which delivers a predetermined amount of the powder onto an enclosed conveyor 80 fitted with an impact flow meter 82 to restrict the flow to 3000 lbs/hour. A pin-mixer agglomerator 84 receives the fine CBp where it is pelletized by mixing with a binder solution (supplied from tank 86), and/or water. Preferably, the pelletization is achieved with water, and with a binder solution. An air line 88 is connected to the agglomerator 84, the air being controlled by shut off valve 90 and regulator 92.

The binder solution tank 86, which holds up to 8000 gallons, is fitted with an agitator 94, a water pipe 96 controlled by valve 98 and fitted with a 5 micron strainer 100. A level indicator 102 is also present at the top of the tank 86 to prevent overflow. The flow of the binding solution from the tank 86 through pipe 103 is controlled by a circulation pump 104. Control valves 106a and 106b, depending on whether opened or closed, can direct the flow of the solution either back into the tank 86, or into the agglomerator 84. Water can be introduced directly into the pin-mixer agglomerator 84 through the water line 108, also fitted with a 5 micron strainer 110, and controlled by shut off valve 112 and control valve 114.

The CBp exits the agglomerator 84 as pellets, preferably of 60 to 100 mesh size, that are transported by an enclosed conveyor belt 116 to a dryer 118, ideally fuelled by the gas produced and collected from the pyrolysis process. The pellets, dried to less than 1% humidity, preferably with an indirect rotary dryer, exit the dryer 118 and fall by gravity down an enclosed chute 119 to enclosed conveyor 120 which brings the pellets to a 100 mesh screen separator 122. Any undersized pellets (i.e., those <149 μm) may passed through a conventional rotary valve 124 and a blower 126 pushes the pellets through conduit 127, which directs same back to surge bin 72 to be re-agglomerated. The oversize pellets, (i.e. those ≧149 μm), are transported by enclosed conveyor 129 to a vibrating bin 128, fitted with a butterfly valve 130, and are ready to be bagged. Any overflow is collected in surge bin 132 fitted with a bin vent filter 134 and level indicator 136. A rotary valve 138 allows the pellets to exit the surge bin 132 onto enclosed conveyor 140, ready for bagging.

Carbon Black (CBp)—Characteristics and Definitions

CBp is not the same as normal cure furnace N series virgin carbon black. Tire composition analysis indicates that there is a fair amount of inorganic compounds, most of these compounds remain with the char after pyrolysis, thus it is possible that the ash content of CBp could be as high as 15% in weight where as virgin carbon black typically has an ash content of below 1%. Small amount of surface deposits of pyrolytic carbon could also be formed and adsorbed on the CBp. However, the amount of insulation on the calciner, the amount of nitrogen and maintaining the calciner system pressure can serve to limit this carbon deposition.

It is not unusual to have N100, N200, N300 N600 and N700 series of virgin carbon black in a tire. Thus the recovered CBp will have a mixture of carbon blacks. However, the modified characteristics of the CBp can also be a plus for some specific applications in the plastic and rubber industries.

Carbon black is the predominant reinforcing filler used in rubber compounds, and the improvement in rubber properties is a function of the physical and chemical characteristics of carbon black. The most important fundamental physical and chemical properties are aggregate size and shape (structure), particle size, surface activities, and porosity. These properties are distributional in nature and this distribution in properties has an impact on rubber performance. Other non-fundamental properties include the physical form and residue. The physical form of carbon black (beads/pellets or powder) can affect the handling and mixing characteristics of carbon black and hence, rubber properties. The ultimate degree of dispersion is also a function of the mixing procedures and equipment used.

Structure/Aggregate Size: Carbon blacks do not exist as primary particles. Primary particles fuse to from aggregates, which may contain large number of particles. The shape and degree of branching of the aggregates is referred to as structure. The structure level of a carbon black ultimately determines its effects on several important in rubber properties. Increasing carbon black structure increases modules, hardness, electrical conductivity, and improves dispersibility of carbon black, but increases compound viscosity.

Particle Size is the fundamental property that has a significant effect on rubber properties. Finer particles lead to increased reinforcement, increased abrasion resistance, and improved tensile strength. However, to disperse finer particles requires increased mixing time and energy. Typical particle sizes range around 8 nanometers to 100 nanometers for furnace black. Surface area is used in the industry as an indicator of the fineness level of the carbon black.

Surface Activity, or Surface Chemistry is a function of the manufacturing process and the heat history of a carbon black. It is difficult to measure directly, surface activity manifests itself through its effect on rubber properties such as abrasion resistance, tensile strength, hysteresis, and modulus. The effect of surface activity on cure characteristics will depend strongly on the cure system in use.

Porosity is a fundamental property of carbon black that can be controlled during the production process. It can affect the measurement of surface area providing a total surface area larger than the external value. Increasing the porosity reduces the density of the aggregates. This allows a rubber compounder to increase carbon loading while maintaining compound specific gravity. This leads to an increase in compound modulus and electrical conductivity for a fixed loading.

Physical Form of carbon black has an impact on the handling and mixing characteristics of the carbon black. The most common form of rubber carbon black is beads (pellets).

The Pyrolytic Carbon Black (CBp) Product

Using their disclosed recycling process, the inventors have demonstrated that the pyrolysis of used rubber tires can generate a CBp that meets the consistently high quality levels demanded by the market. This implies that the CBp produced by the invention has a consistent composition falling within well defined limits following the ASTM (American Society for Testing and Materials) standards testing. To this end, the inventors have carried out extensive research to identify the operating conditions that would result in a CBp that demonstrates acceptable reinforcing levels when used as a filler in rubber. Their findings have shown that the morphology and characteristic of the CBp can be controlled in part by varying the process temperature and residence time. Utilizing the process herein disclosed which allows for strict control of temperature and other parameters such as pressure and the inertness of the gases within the reaction chamber and the cooler, CBp production can be optimized by consistently striking a balance between oil and gas production, and the associated sulphur content in the CBp.

These aspects of the invention will be more fully understood by reference to the following examples which are to be considered as merely illustrative thereof.

Example 1

Cleaned rubber tire shreds of 2" (on the diagonal) were pyrolyzed in an anaerobic environment at four different temperatures: 450° C., 500° C., 600° C. and 700° C. Table 1 shows the process mass balance at the various pyrolysis temperatures. It can been seen that pyrolysis carried out at the higher temperatures favour oil production and while the lower operating temperatures favour char production.

TABLE 1

| Temp (° C.) | Temp (° F.) | Composition % Wt | | | |
|---|---|---|---|---|---|
| | | Gases | Oil | Char | Total |
| 450 | 842 | 5.8 | 40.2 | 46.2 | 92.2 |
| 500 | 932 | 3.1 | 42.3 | 43.7 | 89.1 |
| 600 | 1112 | 6.2 | 44.3 | 40.5 | 91 |
| 700 | 1292 | 5.7 | 45.5 | 38.6 | 89.8 |

Table 2 shows the gross calorific value and sulphur content of the oil and char generated at the four experimental pyrolysis temperatures. The results indicate that the oil sulphur content is greater at the higher pyrolysis temperatures and that contrarily, the char's sulphur content increases as the pyrolysis temperature is lowered.

TABLE 2

| Temp (° C.) | Temp (° F.) | Corrected GCV MJ/KG Oil | Corrected CV MJ/KG Char | Sulphur Content % | |
|---|---|---|---|---|---|
| | | | | Oil | Char |
| 450 | 842 | 42.3 +/− 0.3 | 31.1 +/− 0.6 | 1.11 +/− 0.09 | 2.17 +/− 0.13 |
| 500 | 932 | 42.4 +/− 0.3 | 30.2 +/− 0.2 | 1.11 +/− 0.19 | 2.21 +/− 0.35 |
| 600 | 1112 | 41.9 +/− 0.4 | 30.7 +/− 0.3 | 1.27 +/− 0.19 | 2.04 +/− 0.01 |
| 700 | 1292 | 41.2 +/− 0.4 | 30.6 +/− 0.3 | 1.27 +/− 0.11 | 2.10 +/− 0.03 |

It was also of interest to analyze the surface area of the char as a function of temperature. Table 3 presents the Brunaer, Emmett, and Teller (BET) surface area of the char at the four temperatures investigated. As can be seen, the data suggests that the surface area of the char increases with increasing pyrolysis temperature.

TABLE 3

| Temp (° C.) | Temp (° F.) | BET (m$^2$/g) |
|---|---|---|
| 450 | 842 | 38 |
| 500 | 932 | 55.5 |
| 600 | 1112 | 65.7 |
| 700 | 1292 | 62.4 |

The thermal decomposition of rubber in anaerobic conditions generates gaseous products and the rates of emission of these gases were also found to be correlated to the pyrolysis temperature. Tables 4-7 show the evolution rate of hydrogen, carbon monoxide, carbon dioxide, methane and other hydrocarbon (HC) gases at pyrolysis temperatures of 450° C., 500° C., 600° C. and 700° C. respectively. Table 4 shows that at 450° C., gas evolution climbs up and peaks at about 110 minutes into the pyrolysis process and levels off at around 125 minutes.

TABLE 4

| Time Cumulative (min) | Temp. (° C.) | $H_2 (g)$ | $CO (g)$ | $CO_2 (g)$ Output (Mol) | $CH_4 (g)$ | Other HC Gases |
|---|---|---|---|---|---|---|
| 20 | 110 | 0.001 | 0.001 | 0 | 0 | 0.001 |
| 25 | 200 | 0.002 | 0.002 | 0.001 | 0 | 0.006 |
| 35 | 300 | 0.003 | 0.003 | 0.01 | | 0.013 |
| 40 | 320 | 0.004 | 0.002 | 0.012 | 0.007 | 0.014 |

TABLE 4-continued

| Time Cumulative (min) | Temp. (° C.) | $H_2 (g)$ | $CO (g)$ | $CO_2 (g)$ Output (Mol) | $CH_4 (g)$ | Other HC Gases |
|---|---|---|---|---|---|---|
| 45 | 325 | 0.005 | | 0.005 | 0.012 | 0.022 |
| 55 | 400 | 0.01 | 0.001 | 0.003 | 0.017 | 0.034 |
| 65 | 430 | 0.011 | 0 | 0.003 | 0.02 | 0.032 |
| 85 | 450 | 0.015 | 0 | 0.004 | 0.015 | 0.02 |
| 105 | 425 | 0.065 | 0.002 | 0.006 | 0.036 | 0.05 |
| 125 | 405 | 0.003 | 0 | 0 | 0.002 | 0.002 |
| 155 | 400 | 0.001 | 0 | 0 | | |

At 500° C., the rate of gas evolution increases significantly and peaks in almost half the time when compared to 450° C., that is around 50 minutes into the pyrolysis process. Gas emission is found to level off around 100 minutes (Table 5).

TABLE 5

| Time Cumulative (min) | Temp. (° C.) | $H_2 (g)$ | $CO (g)$ | $CO_2 (g)$ Output (Mol) | $CH_4 (g)$ | Other HC Gases |
|---|---|---|---|---|---|---|
| 20 | 250 | | | 0.002 | 0 | |
| 25 | 360 | 0.005 | 0.004 | | 0.006 | 0.008 |
| 35 | 400 | 0.006 | 0.006 | 0.007 | 0.011 | 0.022 |
| 40 | 430 | 0.007 | 0.004 | 0.005 | 0.016 | 0.03 |
| 45 | 440 | 0.01 | 0.002 | 0.004 | 0.018 | 0.031 |
| 50 | 460 | 0.012 | 0.001 | | 0.014 | 0.018 |
| 60 | 480 | 0.013 | 0 | 0.002 | 0.015 | 0.02 |
| 70 | 490 | 0.011 | 0.002 | | 0.015 | 0.012 |
| 100 | 490 | 0.01 | 0.001 | 0.001 | 0.006 | 0.007 |
| 130 | 500 | 0.008 | 0 | 0 | 0.003 | 0.005 |
| 160 | 500 | 0.005 | 0 | 0 | 0.002 | 0.002 |

As the pyrolysis temperature is increased to 600° C., Table 6 shows that gas evolution peaks earlier, at 40 minutes, and levels off at around 140 minutes.

TABLE 6

| Time Cumulative (min) | Temp. (° C.) | $H_2 (g)$ | $CO (g)$ | $CO_2 (g)$ Output (Mol) | $CH_4 (g)$ | Other HC Gases |
|---|---|---|---|---|---|---|
| 20 | 250 | 0.001 | | 0.002 | 0 | 0.001 |
| 25 | 330 | 0.01 | 0.001 | 0.007 | 0.015 | 0.023 |
| 35 | 370 | 0.015 | 0.007 | 0.006 | 0.011 | 0.028 |
| 40 | 410 | 0.025 | 0.007 | 0.001 | 0.022 | 0.048 |
| 45 | 465 | 0.024 | 0.004 | 0.004 | 0.025 | 0.072 |
| 50 | 460 | 0.022 | 0.004 | 0.005 | 0.025 | 0.062 |
| 60 | 500 | 0.032 | 0.003 | 0.002 | 0.023 | 0.045 |
| 80 | 550 | 0.03 | 0.002 | 0.002 | 0.022 | 0.022 |
| 110 | 560 | 0.02 | 0.001 | 0.002 | 0.01 | 0.002 |
| 140 | 565 | 0.008 | 0.001 | 0.001 | 0.003 | 0.001 |
| 170 | 570 | 0.002 | 0 | 0 | 0 | |

Lastly, Table 7 presents data collected for evolution of the gases when pyrolyzing the rubber shreds at 700° C. It can be seen that gas production peaks at about 38 minutes and levels off around 140 minutes.

TABLE 7

| Time Cumulative (min) | Temp. (° C.) | $H_{2(g)}$ | $CO_{(g)}$ | $CO_{2(g)}$ | $CH_{4(g)}$ | Other HC Gases |
|---|---|---|---|---|---|---|
| | | | | Output (Mol) | | |
| 20 | 275 | 0.002 | | | 0.002 | 0.001 |
| 25 | 410 | 0.0011 | 0.005 | 0.003 | 0.018 | 0.028 |
| 35 | 500 | 0.047 | 0.003 | | 0.021 | 0.093 |
| 40 | 515 | 0.04 | 0.002 | 0.005 | | 0.054 |
| 45 | 525 | 0.054 | 0.002 | 0.002 | 0.043 | 0.055 |
| 55 | 590 | 0.043 | 0.001 | 0.002 | 0.038 | 0.033 |
| 70 | 620 | 0.022 | 0.003 | 0.003 | 0.032 | 0.022 |
| 85 | 660 | 0.028 | 0.003 | 0.002 | 0.015 | 0.013 |
| 115 | 650 | 0.01 | 0.005 | 0.005 | 0.01 | 0.002 |
| 145 | 670 | 0.002 | 0.002 | 0.001 | 0 | 0 |
| 155 | 685 | 0.002 | 0.001 | 0 | 0 | |

In summary, the research shows the critical importance of understanding how the pyrolysis temperature affects the quantity and quality of the oil, char and gas produced. The findings can be summarized as follows:

For the complete pyrolysis of tires, the operating temperature should not go below about 450° C.

High pyrolysis temperatures favour oil yield and consequently, a lower yield of CBp.

Lower pyrolysis temperatures favour char production and consequently, a lower yield of oil.

The rate of gas evolution increases with increasing pyrolysis temperature.

The CBp product contains a higher sulphur content when produced at lower pyrolysis temperatures.

The oil has a higher sulphur content at higher pyrolysis temperatures.

Higher pyrolysis temperatures favour the formation of a CBp having a greater surface area.

Example 2

Used rubber tire shreds of 1½ or less were pyrolyzed at 450° C. in an inert nitrogen atmosphere. Following a cooling period, the char was collected and the steel removed with the use of a magnet. The crude CBp was milled to pass a 325-mesh sieve. The milled CBp (bulk density of 25 lb/ft³) was mixed with 1% Norlig G (calcium lignosulphonate binder) then pelletized using an agglomerator. The product was subsequently dried at a temperature of 120° C. and the product screened at 2.0×150 microns (10×100 mesh). The bulk density of the pellets produced was approximately 35 lb/ft³.

Example 2a

The pelletized CBp was subsequently tested in two natural rubber formulations (ASTM D3192). Rubber compound A was formulated with conventional N-762 and rubber compound B with the CBp. The results are presented in Tables 8, 9 and 10.

TABLE 8

| | Compund A | Compund B |
|---|---|---|
| Natural Rubber | 100 | 100 |
| N-762 | 50 | 0 |
| CBp | 0 | 50 |
| Zinc Oxide | 5 | 5 |
| Stearic Acid | 3 | 3 |

TABLE 8-continued

| | Compund A | Compund B |
|---|---|---|
| Sulphur | 2.5 | 2.5 |
| TBBS | 0.6 | 0.6 |

TABLE 9

Reometer Cure Data at 145° C.

| | Compound A | Compound B |
|---|---|---|
| Min. Torque, lb-in | 14.25 | 11.25 |
| Max. Torque, lb-in | 75.5 | 53.5 |
| Time to 2-pt rise, min | 7.5 | 3.65 |
| Time to 90% cure, min | 21.25 | 14.5 |
| Cure rate ($t_{90} - t_2$), min | 13.75 | 10.85 |

TABLE 10

Vulcanize Normal Properties

| | Compound A | Compound B |
|---|---|---|
| Cure Time at 145° C., min | 20 | 14 |
| Hardness Shore A | 59 | 53 |
| Modulus psi 100% | 370 | 225 |
| Modulus psi, 300% | 1770 | 615 |
| Tensile Strength psi | 3410 | 2250 |
| Elongation @ Break % | 485 | 570 |
| Tear Strength Die C | 314 | 220 |
| Compression Set % | 16.5 | 19 |

Example 2b

The utility and reliability of the styrene butadiene rubber (SBR) have made this copolymer the most important and widely used rubber in the world. The following results show the reinforcement character of the CBp in a blend formula with a higher structure carbon black, N339. The same blend with conventional N-762 is also compared (Tables 11-13).

TABLE 11

| | Compound A | Compound B | Compound C |
|---|---|---|---|
| SBR-1712 | 137.5 | 137.5 | 137.5 |
| N-339 | 82.5 | 41.5 | 41.5 |
| N-762 | 0 | 0 | 41.5 |
| CBp | 0 | 41.5 | 0 |
| Sundex 790 | 25 | 25 | 25 |
| Zinc Oxide | 3 | 3 | 3 |
| Sulphur | 1.75 | 1.75 | 1.75 |
| Stearic Acid | 1.5 | 1.5 | 1.5 |
| TBBS | 1.25 | 1.25 | 1.25 |

TABLE 12

Reometer Cure Data at 145° C.

| | Compound A | Compound B | Compound C |
|---|---|---|---|
| Min. Torque, lb-in | 14 | 14 | 14 |

TABLE 12-continued

Reometer Cure Data at 145° C.

|  | Compound A | Compound B | Compound C |
|---|---|---|---|
| Max. Torque, lb-in | 41 | 36 | 36 |
| Time to 2-pt rise, min | 2.7 | 3.1 | 3.1 |
| Time to 90% cure, min | 6.2 | 6.9 | 6.2 |
| Cure rate ($t_{90} - t_2$), min | 96 | 80 | 83 |

TABLE 13

Vulcanize Normal Properties

|  | Compound A | Compound B | Compound C |
|---|---|---|---|
| Durometer Hardness | 65 | 58 | 58 |
| Modulus psi 100% | 318 | 198 | 253 |
| Modulus psi, 300% | 1258 | 640 | 893 |
| Tensile Strength psi | 1986 | 1139 | 1430 |
| Elongation @ Break % | 465 | 547 | 500 |
| Specific Gravity | 1.15 | 1.15 | 1.15 |

Example 3

Used rubber tire shreds of 1½" or less were pyrolyzed at 500° C. in an inert nitrogen atmosphere. Following a cooling period, the char was collected and the steel removed with the use of a magnet. The crude CBp was milled to pass a 325-mesh sieve. The milled CBp (bulk density of 25 lb/ft³) was mixed with 1% Norlig G (calcium lignosulphonate binder) then pelletized using an agglomerator. The product was subsequently dried at a temperature of 120° C. and the product screened at 2.0×150 microns (10×100 mesh). The bulk density of the pellets produced was approximately 35 lb/ft³.

Example 3a

The CBp was tested by using it in a natural rubber formulation according to ASTM 3192. The results are set out in Tables 14-16.

TABLE 14

|  | Compound A | Compound B | Compound C |
|---|---|---|---|
| Natural | 100 | 100 | 100 |

TABLE 14-continued

|  | Compound A | Compound B | Compound C |
|---|---|---|---|
| Rubber |  |  |  |
| CBp | 50 | 0 | 35 |
| N-762 | 0 | 50 | 0 |
| N-330 | 0 | 0 | 15 |
| Zinc Oxide | 5 | 5 | 5 |
| Stearic Acid | 3 | 3 | 3 |
| Sulphur | 2.5 | 2.5 | 2.5 |
| TBBS | 0.6 | 0.6 | 0.6 |

TABLE 15

Reometer Cure Data at 145° C.

|  | Compound A | Compound B | Compound C |
|---|---|---|---|
| Min. Torque, lb-in | 16.5 | 16.75 | 19.25 |
| Max. Torque, lb-in | 80.7 | 81.5 | 81.5 |
| Time to 2-pt rise, min | 3.5 | 4.5 | 4 |
| Time to 90% cure, min | 18 | 17 | 17 |
| Cure rate ($t_{90} - t_2$), min | 14.5 | 12.5 | 13 |

TABLE 16

Vulcanize Normal Properties

|  | Compound A | Compound B | Compound C |
|---|---|---|---|
| Hardness Shore A | 60 | 61 | 63 |
| Modulus psi 100% | 345 | 355 | 415 |
| Modulus psi, 300% | 1390 | 1570 | 1695 |
| Tensile Strength psi | 3640 | 3280 | 3645 |
| Elongation @ Break % | 530 | 490 | 505 |
| Tear Strength Die C | 357 | 347 | 395 |

Based on the described pyrolysis conditions and follow up controlled operating conditions as described in Examples 1, 2 and 3, the inventors have discovered that the pyrolysis of rubber tire shreds at temperatures between about 450 and 500° C., but preferably at about 500° C., can generate a high grade marketable CBp product. Properties of the CBp produced include a toluene discoloration transmission of 90%. Other characteristic of the CBp are summarized in Table 17 and were measured on a sample free of steel and milled with undersize below 325 mesh prior to pelletization.

TABLE 17

| Properties | UNITS | N762 | N550 | CBp | ASTM |
|---|---|---|---|---|---|
| Ash content | % | 0.26 | 0.34 | 9-15 | D1516 |
| Pour density | lb/ft³ | 31.2 | 22.6 | 24-26 | D1513 |
| Heat loss, as packaged | % | 0.1 | 0.1 | 1.0 max | D1509 |
| 35 mesh sieve residue | % | 0 | 0 | 0 | D1514 |
| 325 mesh sieve residue | % | 0.003 | 0.002 | 0.2 max | D1514 |
| Toluene discoloration, 425 mu | % | 83 | 95 | 90 | D1613 |
| Pellet crush strength, min | gm | 14 | 8 | 20 | D1937 |
| Pellet crush strength, max | gm | 41 | 32 | 50 | D1937 |
| Fine 5' rotap (pelleted fines content) max | % | 4.4 | 3.6 | 8 | D1508 |
| Iodine adsorption | mg/gm | 28.3 | 43.3 | 30 | D1510 |
| DBP[1] | cc/100 gm | 64.4 | 119.9 | 65 | D2414 |

TABLE 17-continued

| Properties | UNITS | N762 | N550 | CBp | ASTM |
|---|---|---|---|---|---|
| Min. tensile-SBR[2] | psi | 3110 | 2070 | 2500 | D3191 |
| Min. tensile-NR[3] | psi | 3627 | 3740 | 3100 | D3192 |

[1] n-dibutyl phthalate absorption number
[2] styrene-butadiene rubber
[3] natural rubber Other modifications and alterations may be used in the design and manufacture of other embodiments according to the present invention without departing from the spirit and scope of the invention, which is limited only by the accompanying claims.

We claim:

1. A pyrolytic carbon black having; in combination
   a) an ash content ranging between 9-15%;
   b) a toluene discoloration at 425 mu of between 80-90% transmission;
   c) an iodine adsorption between 30 and 45 mg/g;
   d) a pour density of between 24-26 lb/ft$^3$;
   e) an n-dibutyl phthalate absorption number of up to 65 cc/100 gm; and,
when produced from a continuous recycling process for rubber tires comprising the steps of:
   a) shredding cleaned rubber tires into shreds less than 2" long;
   b) pyrolyzing the shreds in a reaction chamber of a thermal processor in a first anaerobic environment to produce a char; wherein the temperature within the reaction chamber is between 450-550° C.;
   c) drawing off volatile organics from the reaction chamber;
   d) removing the char from the reaction chamber;
   e) cooling: the char in a second anaerobic environment;
   f) removing metal and textile components from the char to obtain pyrolytic carbon black; and,
   g) milling and sizing the pyrolytic carbon black so obtained into particles of 325 mesh size or less.

2. A pyrolytic carbon black according to claim 1, wherein the temperature within the reaction chamber is between 450-500° C.

3. A pyrolytic carbon black according to claim 2, wherein the temperature within, the reaction chamber is 500° C.

4. A pyrolytic carbon black according to claim 1, wherein the process further comprises, after step g) the step of pelletizing the pyrolytic, carbon black into pellets of 60 to 100 mesh size.

5. A pyrolytic carbon black according to claim 1 wherein the shreds are less than 1.5" long.

6. A pyrolytic carbon black according to claim 1, wherein the process further comprises, prior to step b), lubricating and cleaning the shreds.

7. A pyrolytic carbon black produced from pyrolyzed rubber, said pyrolytic carbon black having:
   a) an ash content ranging between 9-15%;
   b) a toluene discoloration at 425 mu of between 80-90% transmission;
   c) an iodine adsorption between 30 and 45 mg/g;
   d) a pour density of between 24-26 lb/ft$^3$; and,
   e) an n-dibutyl phthalate absorption number of up to 65 cc/100 gm.

8. A pyrolytic carbon black according to claim 7, which, when used to make rubber, produces a rubber having a minimum tensile strength between 2500-3100 psi.

9. A pyrolytic carbon black according to claim 8, wherein the rubber is styrene-butadiene copolymer rubber and the minimum tensile strength is 2500 psi.

10. A pyrolytic carbon black according to claim 8, wherein the rubber is natural rubber and the minimum tensile strength is 3100 psi.

* * * * *